US011142101B2

(12) United States Patent
Jones et al.

(10) Patent No.: US 11,142,101 B2
(45) Date of Patent: Oct. 12, 2021

(54) SEAT ASSEMBLY HAVING A RECLINING MECHANISM

(71) Applicant: LEAR CORPORATION, Southfield, MI (US)

(72) Inventors: Jeffrey A. Jones, Ann Arbor, MI (US); Johannes Barzen, Pfaffenhofen (DE); Eckhard Nock, Wolnzach (DE)

(73) Assignee: LEAR CORPORATION, Southfield, MI (US)

( * ) Notice: Subject to any disclaimer, the term of this patent is extended or adjusted under 35 U.S.C. 154(b) by 67 days.

(21) Appl. No.: 16/663,409

(22) Filed: Oct. 25, 2019

(65) Prior Publication Data

US 2020/0130540 A1 Apr. 30, 2020

(30) Foreign Application Priority Data

Oct. 30, 2018 (DE) .......................... 102018218595.6

(51) Int. Cl.
*B60N 2/22* (2006.01)
*B60N 2/20* (2006.01)

(52) U.S. Cl.
CPC ............. *B60N 2/2227* (2013.01); *B60N 2/20* (2013.01)

(58) Field of Classification Search
CPC ............... B60N 2/2245; B60N 2/2227; B60N 2002/952; B60N 2/919; B60N 2/206; B60N 2/20; B60N 2/22; B60N 2/01516
USPC .................................................... 297/378.13
See application file for complete search history.

(56) References Cited

U.S. PATENT DOCUMENTS

| 6,164,419 | A | 12/2000 | Tribbett | |
|---|---|---|---|---|
| 6,769,741 | B2* | 8/2004 | Denning | B60N 2/2245 297/354.12 |
| 7,845,732 | B2 | 12/2010 | Liu et al. | |
| 8,146,996 | B2* | 4/2012 | Vedder | B60N 2/366 297/378.13 |
| 8,506,014 | B2* | 8/2013 | Bruck | B60N 2/2245 297/378.13 |
| 9,381,831 | B2* | 7/2016 | Mitsuhashi | B60N 2/2218 |
| 2003/0075394 | A1 | 4/2003 | Shields et al. | |
| 2005/0062327 | A1* | 3/2005 | Griswold | B60N 2/2245 297/378.1 |

FOREIGN PATENT DOCUMENTS

| DE | 69408726 | T2 | 7/1998 | |
|---|---|---|---|---|
| DE | 19707995 | A1 | 9/1998 | |
| DE | 19857947 | A1 * | 6/2000 | .......... B60N 2/2245 |
| DE | 10058619 | A1 | 7/2001 | |
| DE | 102009022518 | A1 | 11/2010 | |

OTHER PUBLICATIONS

Office Action of German Application No. 10 2018 218 595.6 dated Jun. 6, 2019, 11 pages.

* cited by examiner

*Primary Examiner* — Milton Nelson, Jr.
(74) *Attorney, Agent, or Firm* — Brooks Kushman P.C.

(57) ABSTRACT

A seat assembly includes a seat back that is pivotable about an axis of rotation, and a reclining assembly. The reclining assembly includes a base, a carrier secured to the base and including a rod guide, a curved rod interfacing the rod guide, a spring having a fixed end and a rotatable end, and a curved spring housing that extends over the spring.

Figure 1:
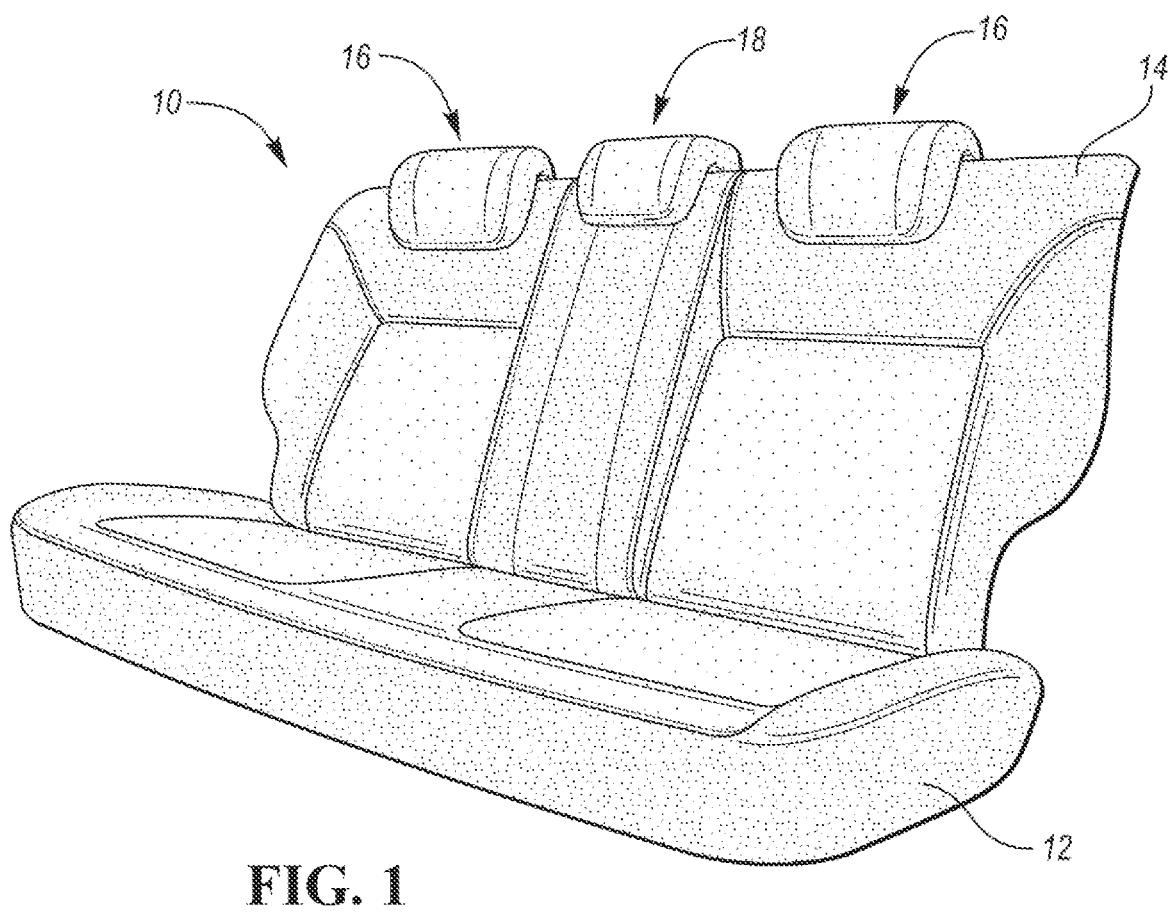

20 Claims, 3 Drawing Sheets

SEAT ASSEMBLY HAVING A RECLINING MECHANISM

CROSS REFERENCE TO RELATED APPLICATION

This application claims foreign priority benefits under 35 U.S.C. § 119(a)-(d) to DE 10 2018 218 595.6, filed Oct. 30, 2018, the disclosure of which is hereby incorporated by reference in its entirety.

TECHNICAL FIELD

The disclosure relates to a seat assembly having a reclining mechanism.

BACKGROUND

Vehicle seats may be provided with mechanisms for enabling seat movement. Examples of such mechanisms are disclosed in U.S. Pat. No. 9,085,248.

SUMMARY

In at least one approach, a vehicle seat assembly is provided. The vehicle seat assembly may include a seat back that may be pivotable about an axis of rotation and including a first connector. The vehicle seat assembly may further include a reclining assembly. The reclining assembly may include a base adapted to be mounted to a portion of a vehicle, and a carrier secured to the base and including a rod guide. The reclining assembly may further include a curved rod that may interface the rod guide for movement relative to the base. The curved rod may have a radius of curvature that may extend from an origin proximate the axis of rotation when the seat assembly is mounted in the vehicle. The reclining assembly may further include a second connector that may be attached to the curved rod and may be attachable to the first connector. The reclining assembly may further include a spring that may be disposed about the curved rod and may have a fixed end that may be fixed relative to the base and a movable end that may be movable with respect to the fixed end. The spring may be movable between a first orientation for retaining the curved rod with respect to the base and a second orientation for allowing the curved rod to move with respect to the base to adjust pivot angle of the seat back.

In at least one approach, an adjustable connector assembly for use with a vehicle seat back pivotally mounted in a vehicle is provided. The adjustable connector assembly may include a base that may be adapted to be mounted to a portion of the vehicle, and a carrier that may be secured to the base and that may include a rod guide. The adjustable connector assembly may further include a curved rod that may interface the rod guide for movement relative to the base. The curved rod may define a first curved central axis. The adjustable connector assembly may further include a connector that may be attached to the curved rod and attachable to the seat back, and a spring that may be disposed about an outer perimeter of the curved rod. The spring may have a fixed end and a movable end. The spring may be movable between a first orientation for retaining the curved rod with respect to the base and a second orientation for allowing the curved rod to move with respect to the base.

In at least one approach, a seat assembly is provided. The seat assembly may include a seat back that is pivotable about an axis of rotation, and a reclining assembly. The reclining assembly may include a base that may be adapted to be mounted to a portion of a vehicle. The reclining assembly may further include a carrier secured to the base and including a rod guide. The reclining assembly may further include a curved rod that may interface the rod guide for movement to relative to the carrier. The curved rod may have a radius that may extend from an origin proximate the axis of rotation. The reclining assembly may further include a spring that may have a fixed end and a rotatable end. The reclining assembly may further include a curved spring housing that may extend over the spring.

In at least one approach, a vehicle seat adjustable striker assembly is provided. The vehicle seat adjustable striker assembly may include a base adapted to be mounted to a portion of a vehicle, and a carrier secured to the base and including a rod guide. The vehicle seat adjustable striker assembly may further include a curved rod that may interface the rod guide for movement to relative to the carrier. The curved rod may define a first curved central axis. The vehicle seat adjustable striker assembly may further include a spring that may be disposed about an outer perimeter of the curved rod. The spring may have a fixed end and a rotatable end. The vehicle seat adjustable striker assembly may further include a curved spring housing that may be secured to the carrier and that may extend over the spring. The curved spring housing may define a second curved central axis coaxial with the first curved central axis.

In at least one approach, a vehicle seat adjustable striker assembly is provided. The vehicle seat adjustable striker assembly may include a base adapted to be mounted to a portion of a vehicle. A first carrier may be secured to the base and may include a first rod guide that defines a first central axis. A second carrier may be secured to the base and may include a second rod guide that defines a second central axis. The second central axis may intersect the first central axis at an oblique angle. The vehicle seat adjustable striker assembly may further include a spring housing that may extend between the first and second carriers. The vehicle seat adjustable striker assembly may further include a spring that may be disposed within the spring housing and that may extend between the first and second carriers.

BRIEF DESCRIPTION OF THE DRAWINGS

FIG. 1 is a perspective view of an exemplary seat assembly.

FIG. 2 is a front perspective view of a seat back frame of the seat assembly.

FIG. 3 is a perspective view of a reclining assembly.

FIG. 4 is an enlarged perspective view of a portion of the reclining assembly with the spring housing and latch removed.

DETAILED DESCRIPTION

As required, detailed embodiments are disclosed herein; however, it is to be understood that the disclosed embodiments are merely exemplary, and that various and alternative forms may be employed. The figures are not necessarily to scale; some features may be exaggerated or minimized to show details of particular components. Therefore, specific structural and functional details disclosed herein are not to be interpreted as limiting, but merely as a representative basis for teaching one skilled in the art.

Referring to FIG. 1, an exemplary seat arrangement or seat assembly 10 is shown. The seat assembly 10 may be mounted in a vehicle, such as a motor vehicle like a car or truck. The seat assembly 10 may be configured as a rear seat that may be positioned behind a front seating row or front seat that may be occupied by a vehicle driver.

An individual seat of the seat assembly 10 may include a seat bottom 12 and a seat back 14, and may further include a reclining assembly or mechanism 50, as discussed in greater detail elsewhere herein.

The seat bottom 12 may be configured to be mounted on a support surface, such as a floor pan of a vehicle. The seat bottom 12 may be configured to support a seat occupant.

The seat back 14 may be disposed proximate the seat bottom 12 and may be configured to support the back of a seat occupant. The seat back 14 or a portion thereof may be configured to pivot or rotate with respect to the seat bottom 12.

The seat bottom 12 and the seat back 14 may provide one or more seating positions. For instance, the seat assembly 10 may have one or more primary seating positions 16 and a secondary seating position 18. The secondary seating position 18 may be disposed between two primary seating positions 16 and may be located near or at the center of the seat assembly 10.

Figure 2:
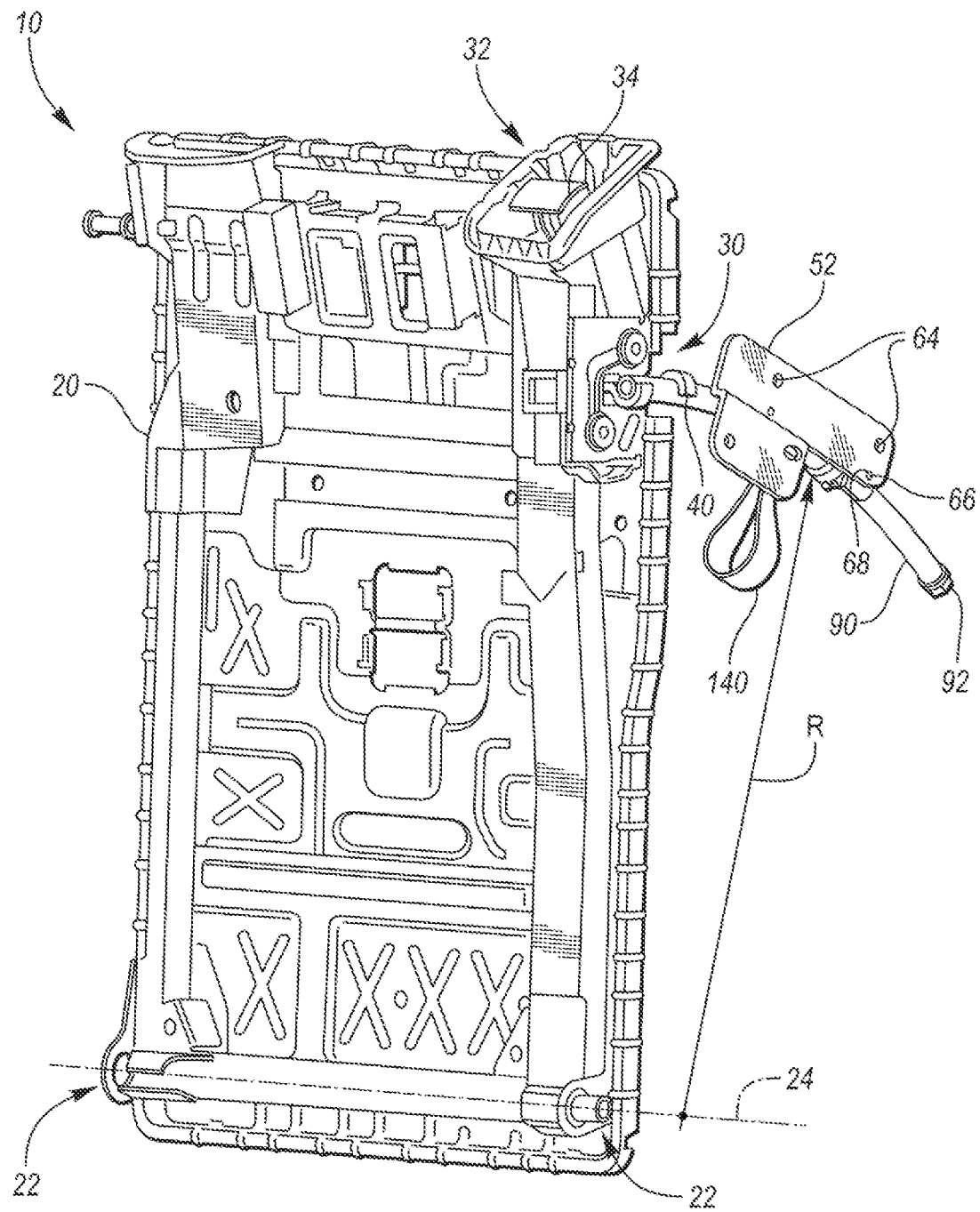

Referring to FIG. 2, the seat back 14 is shown without a trim cover and seat cushions to more clearly illustrate a seat back frame 20 of the seat assembly 10. The seat back frame 20 may be configured to be mounted to the vehicle. For example, the seat back frame 20 may be mounted to a vehicle body at one or more mounting interfaces 22. The mounting interfaces 22 may define an axis 24 about which the seat back 14 may be rotated.

The seat back 14 may further include a first connector, such as a latch mechanism 30, connected to the seat back frame 20 and a connector actuator, such as a latch release mechanism 32, that is also connected to the seat back frame 14. The latch release mechanism 32 may be configured to actuate (e.g., release) the latch mechanism 30. At least a portion of the latch release mechanism 32 may be disposed under a cover that may support a seat cushion and/or a trim cover. In at least one approach, the latch release mechanism 32 may include a release handle 34 that may facilitate manual actuation of the latch mechanism 30. For example, the release handle 34 may be disposed proximate a top of the seat back portion and may be operatively connected to the latch mechanism 30, such as by a linkage and/or a cable. In this way, force exerted on the release handle 34 may be transmitted to the latch mechanism 30 to actuate the latch mechanism 30 from a closed condition to an open condition. In the closed condition, the latch mechanism 30 engages a second connector, such as a latch striker or striker 40, to inhibit, or substantially inhibit, movement of the seat back 14 relative to the striker 40. In still another approach, the first connector may be a latch striker or striker, and the second connector may be a latch mechanism.

In the open condition, the latch mechanism 30 may be disengaged from the striker 40 to permit movement of the seat back 14 relative to the striker 40. As such, the seat back frame 20 may have multiple seat back portions that may be configured to pivot or rotate from a generally upright seating position shown in FIG. 2 to a folded position in which at least a portion of the seat back 14 and seat back frame 20 may be folded over the seat bottom 12 and may engage the seat bottom 12.

Figure 3:
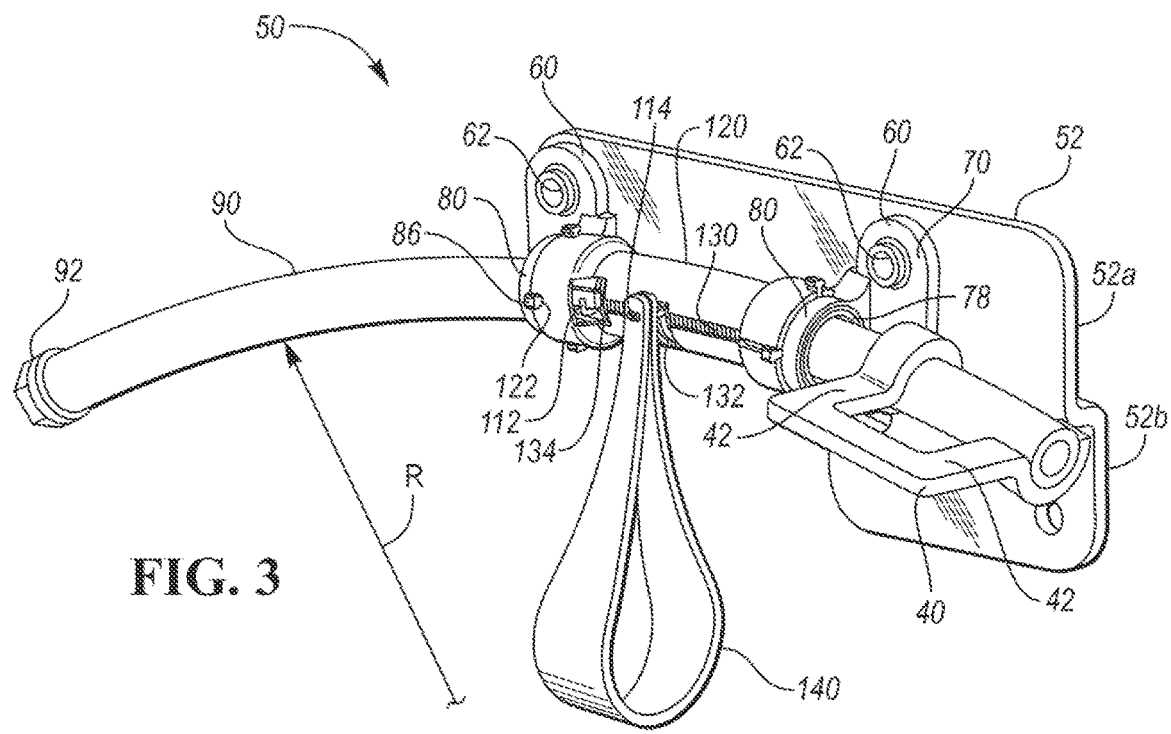

Referring to FIG. 3, the striker 40 may be a component of a reclining assembly or mechanism 50, which may also be referred to as an adjustable connector assembly. The reclining mechanism 50 may further include a base, referred to herein as an attachment plate 52, that may be secured, for example, to a frame or body portion of a vehicle. In this way, the attachment plate 52 may include at least one planar portion. In the approach shown in FIG. 3, the attachment plate 52 includes two planar portions 52a, 52b that extend in offset, parallel planes. One or both planar portions, such as portion 52a, for example, may be fastened to the vehicle body through one or more fasteners, one or more welds, or combination thereof.

The reclining mechanism 50 may further include one or more housing carriers 60. For example, two housing carriers 60 may be secured to the attachment plate 52. More particularly, the two housing carriers 60 may be secured to portion 52a of the attachment plate 52. It is expressly contemplated herein that the reclining mechanism 50 may be provided with one housing carrier, or three or more housing carriers.

The housing carriers 60 may be secured to the attachment plate 52 through one or more fasteners. In this way, the housing carriers 60 may be provided with one or more through-holes 62 disposed in alignment with through-holes 64 (shown in FIG. 2) of the attachment plate 52. In at least one approach, the through-holes of the housing carriers 60 extend through mounting portions 70 of the housing carriers 60. As also shown in FIG. 2, the housing carriers 60 may further be provided with one or more locating features 66. The locating features 66 may be, for example, protrusions that extend from inwardly-facing surfaces of the mounting portions 70 of the housing carriers 60. The locating features may be received in corresponding recesses 68 or apertures in the attachment plate 52.

In still another approach, one or more housing carriers may be integrally formed with the attachment plate 52. The integrated housing carrier may have a similar or dissimilar structure as that of housing carrier 60.

Figure 4:
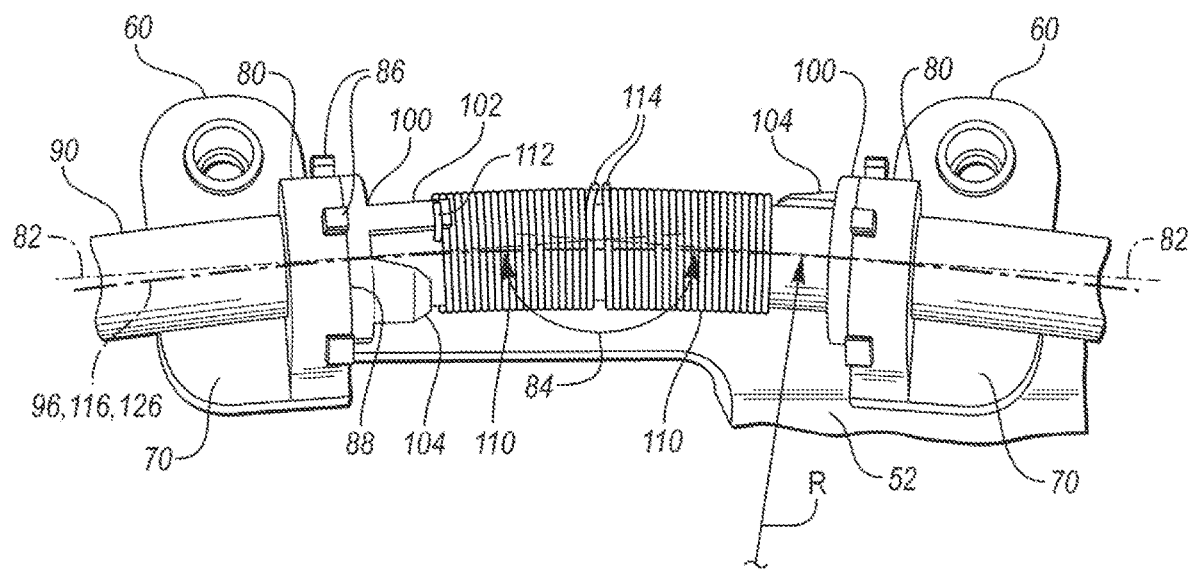

As shown in FIGS. 3 and 4, a housing carrier 60 may include a rod guide 80. The rod guide 80 may be a boss or protrusion that may extend from the mounting portion 70; for example, in a plane that may extend substantially orthogonally relative to the mounting portion 70.

The rod guide 80 may define a through-hole that may be, for example, a circular through-hole. As such, with reference to FIG. 4, the rod guide 80 may define a central axis 82 that extends through the rod guide 80. The central axis 82 may be a linear central axis. As such, the linear central axis 82 may not include a radius of curvature. As depicted, the reclining mechanism 50 may include two housing carriers 60 secured to the attachment plate 52. In the installed configuration, the housing carriers 60 may be oriented such that the central axes 82 intersect at an oblique angle 84. The oblique angle 84 may be in the range, for example, of approximately (e.g., +/−one degree) 2 degrees to approximately 50 degrees; for example, approximately 5 degrees, 10 degrees, 15 degrees, 20 degrees, etc. A bushing 78 may be provided in the through-hole of the rod guide 80.

A housing carrier 60 may further define one or more keys 86 or protrusions that extend from the rod guide 80. For example, a housing carrier 60 may include three keys 86 annularly spaced about the central axis 82 and extending radially from an outer surface of the rod guide 80. The keys 86 may be generally T-shaped or mushroom-shaped keys. In this way, the keys 86 may define a neck region that extends from the outer surface of the rod guide 80, and a head region that extends from the neck region. The head region may have an outer dimension greater than an outer dimension of the neck region.

A housing carrier 60 may further define a sawtooth interface 88. The sawtooth interface 88 may be disposed at an inwardly-facing surface of the housing carrier, and may extend annularly about (e.g., entirely about) the central axis 82. With this design, a leg or post 102 of a spring retainer 100 may be pivotably adjusted to position a first end 112 of a clamping spring 110. When winding the clamping spring 110 about the locking rod 90, there may be a large tolerance based on the diameter of the locking rod tolerance and the spring internal diameter tolerance. For example, the locking rod 90 may have outer diameter shaped different than the clamping spring 110. For example, the locking rod 90 may have outer shape such as square, while the clamping spring 110 has a circular inner diameter.

The reclining mechanism 50 may further include a guide member, which may be the locking rod 90. In at least one approach, the locking rod 90 is a hollow locking tube. In still other approaches, the locking rod 90 is a solid or filled locking rod. As such, the locking rod 90 may be referred to as a locking bar, locking rail, locking guide, locking tube, etc.

The locking rod 90 is preferably a curved locking rod. The locking rod 90 may define, or may extend along, a curved central axis 96. In this way, the locking rod 90 may define a radius R, as shown in FIGS. 2 and 3. The radius R may be, for example, approximately (e.g., +/−5 mm) 350 mm to approximately 550 mm, and more particularly, approximately 400 mm to approximately 500 mm. In at least one approach, the radius R may extend from an origin that is at or proximate (e.g., within 100 mm) the axis of rotation 24 show in FIG. 2. As such, the radius R may correspond to a distance from the locking rod 90 to the axis 24 about which the seat back 14 may be rotated (e.g., at the mounting interfaces 22). In still another approach, the radius R may not correspond to the distance from the locking rod 90 to the axis 24.

The locking rod 90 may be received within the rod guides 80 of the housing carriers 60. An end cap 92 may be provided at a first end of the locking rod 90. The end cap 92 may be secured to the locking rod 90, for example, in threaded engagement, in interference-fit engagement. The end cap 92 may also, or instead, be welded or otherwise rigidly secured to the locking rod 90.

The striker 40 may be secured to the locking rod 90. For example, the striker 40 may be secured to an end of the locking rod 90 opposite the housing carriers 60 from the end cap 92. The striker 40 may include arms 42 that extend toward, and into engagement with the locking rod 90. The arms may define internal abutment walls. The arms 42 may be sized and dimensioned so as to receive the latch mechanism 30 therebetween, and further to permit selective movement of the latch mechanism 30 within and out of the striker 40. A first arm may extend over an upper surface of the locking rod, and a second arm may extend over a lower surface of the locking rod. In this way, ultimate strength loads may be distributed to the locking rod 90 in a desirable manner (e.g., relatively more evenly).

In at least one approach, the arms 42 are welded to the locking rod 90 such that the striker 40 is rigidly secured and movably fixed relative to the locking rod 90. In this way, when the locking mechanism 50 is in an unlocked configuration, movement of the striker 40 (for example, as driven by seat back 14) may effect a corresponding movement of the locking rod 90 within, and relative to, the housing carriers 60. As such, the reclining mechanism 50 may guide the seat back 14 as it is rotated about axis 24.

In still another approach, a striker may be integrally formed with the locking rod 90. The integrated striker may have a similar or dissimilar structure as that of striker 40.

Referring to FIGS. 3 and 4, the reclining mechanism 50 may further include internal and external locking components to lock the seat back 14 at a desired inclination. As shown in FIG. 4, spring retainers 100 may be secured to the housing carriers 60. For example, the spring retainers 100 may be disposed at, and may interface, the sawtooth interface 88 of the housing carriers 60. In this way, the spring retainers 100 may also be provided with a sawtooth interface.

A spring retainer 100 may define a central aperture that may be have a central axis that is coaxial with the central axis 82 of the interfacing housing carrier 60. In this way, the locking rod 90 may extend through the spring retainers 100. A spring retainer 100 may further define a retention leg or post 102 that extends away from the housing carrier 60. A spring retainer 100 may further define a load transmitter 104 that also extends away from the housing carrier 60. The load transmitter 104 may transmit ultimate loads into a clamping spring 110. The load transmitter 104 may have a generally curved shape so as to twist the clamping spring 110 such that the clamping spring 110 engages or bites into the locking rod 90.

The reclining mechanism 50 may include one or more clamping springs 110. The clamping springs 110 may be torsion springs, and may be eccentrically loaded about the central axes of the clamping springs 110. A clamping spring 110 may include a first end 112 that is engaged with a spring retainer 100, and a second end 114 opposite the first end 112. The first end 112 may include a curved region that wraps around the retention post 102 of the spring retainer 100. The second end 114 may be a linear portion that protrudes away from the locking bar 90. As will be appreciated, a release strap may be secured to the second end 114 for rotating the second end 114 relative to the first end 112. In this way, the first end 112 may be referred to as a fixed end, and the second end 114 may be referred to as a rotatable, translatable, adjustable, or moveable end.

As the locking rod 90 is a curved locking rod, the clamping springs 110 may extend about a curved central axis 116 when assembled or installed about the locking rod 90. The curved central axis 116 may have a radius that corresponds to, or substantially corresponds the radius R of the locking rod 90. As such, the curved central axis 116 may be coaxial with the curved central axis 96 of the locking rod 90.

Although two clamping springs 110 are depicted, it is expressly contemplated that one clamping spring, or three or more clamping springs may be provided.

The reclining mechanism 50 may further include a spring housing 120. The spring housing 120 may be a hollow housing such that the spring housing receives the locking rod 90 and clamping springs 110 within an internal cavity of the spring housing 120. The spring housing 120 may be disposed in engagement with the housing carriers 60. For example, the spring housing 120 may define notches 122 that may be sized to receive the keys 86. In at least one approach, the notches 122 may receive the neck portions of the keys 86, and the head portions of the keys 86 may extend along a portion of the surface of the spring housing 120 adjacent the notches 122. Upon assembly, the keys 86 may be riveted, welded, or otherwise deformed relative to the spring housing 120. In this way, the spring housing 120 may be axially fixed between the housing carriers 60, and may further be rotatably fixed to the housing carriers 60.

The spring housing 120 may be a curved spring housing. In this way, the spring housing 120 may define a curved central axis 126. The curved central axis 126 may have a radius that corresponds to, or substantially corresponds the radius R of the locking rod 90. As such, the curved central axis 126 may be coaxial with the curved central axis 96 of the locking rod 90, and/or the curved central axis 116 of the spring housing 110.

The spring housing 120 may define a longitudinal slot 130, a transverse slot 132, and one or more loading windows 134. The longitudinal slot 130 may extend, for example, substantially parallel to a central longitudinal axis of the spring housing 120. The transverse slot 132 may be disposed, for example, at a central portion of the spring housing, and may intersect the longitudinal slot 130. In at least one approach, the transverse slot 132 extends at least 45 degrees about a central axis (e.g., curved central axis 126) of the spring housing 120. A first loading window 134 may be disposed proximate an end region of the spring housing 120 and may also intersect the longitudinal slot 130. A second loading window may be disposed on an opposite surface of the spring housing 120, and/or at an opposite end of the spring housing 120. The longitudinal slot 130 may not intersect the second loading window. The loading windows 134 may be positioned and dimensioned to permit a user to observe and/or access a portion of a clamping spring 110; for example, the first ends 112 of the clamping springs 110.

The transverse slot 132 may be positioned and dimensioned to permit at least a portion of the clamping springs 110 to extend therethrough. For example, linear portions of the second ends 114 of the clamping springs 110 may extend through the transverse slot 132 and outside of the spring housing 120. The second ends 114 may be rotationally-biased into engagement with a wall of the transverse slot 132 when the second ends 114 are in a first rotational orientation.

The transverse slot 132 may further be positioned and dimensioned to permit rotational movement of a second end 114 of a clamping spring 110; for example, from the first rotational orientation to a second rotational orientation angularly offset from the first rotational orientation. As discussed, the transverse slot 132 may extend at least 45 degrees about a central axis (e.g., curved central axis 126) of the spring housing 120. In this way, the second ends 114 of the clamping springs 110 may be rotated up to 45 degrees or more through the transverse slot 132.

The reclining mechanism 50 may further include a release strap 140. The release strap 140 may be, for example, a fabric release strap, and may be in the form of a loop. The release strap 140 may be secured to at least a portion of one or more clamping springs 110. For example, the release strap 140 may be secured to the second ends 114 of the clamping springs 110 proximate the transverse slot 132. The release strap 140 may be fixed to the clamping springs 110 such a user pulling on the release strap 140 may effect a rotational movement of the second ends 114 of the clamping springs 110. More particularly, the release strap 140 may be suitable for applying a force in a direction tangent, or generally tangent, to the coil of the clamping springs 110. As the first ends 112 of the clamping springs 110 are fixed (e.g., to retention legs 102 of the spring retainers 100), a sufficient force may have the effect of rotating the second ends 114 of the clamping springs 110.

In operation, the reclining mechanism 50 defaults to clamping the clamping springs 110 about the locking rod 90 with sufficient force to movably fix the locking rod 90 relative to the spring housing 120, housing carriers 60, and attachment plate 52. In this way, a desired inclination of a seat back 14 may be maintained. This may be referred to as a locked configuration.

To adjust the inclination of the seat back 14, a user may exert a force (e.g., a pull force) on the release strap 140. As discussed, the force may be in a direction tangent, or generally tangent, to the coil of the clamping springs 110. Upon exertion of a sufficient force, the release strap 140 rotates the second ends 114 of the clamping springs 110 relative to the rotatably-fixed first ends 112. The second ends 114 of the clamping springs 110 may thus be rotated within the transverse slot 132. This rotation acts to increase the inner diameter of at least a portion of the claiming springs 110. Upon sufficient rotation, the inner diameter may be increased to reduced or eliminate the clamping force on the locking rod 90. This may be referred to as an unlocked configuration. A sufficient rotation may be, for example, approximately 40 degrees to approximately 50 degrees.

In the unlocked configuration, a user is able to rotate the seat back 14; for example, about axis 24. As the user rotates the seat back 14, the locking rod 90 moves or translates, in a curving manner, through the clamping springs 110 and relative to the rod guides 80 of the housing carriers 60. The unlocked configuration may be maintained as long the user maintains a sufficient force on the second ends 114 of the clamping springs 110 (e.g., via the release strap 140).

Upon achieving a desired inclination of the seat back 14, the user may release the force on the second ends 114 of the clamping springs 110 (e.g., by releasing or reducing the forces on the release strap 140). The second ends 114 of the clamping springs 110 may rotate within the transverse slot 132 back to the initial, locked configuration. In doing so, the inner diameters of the clamping springs 110 is reduced, and the clamping springs 110 exert a locking (compression) force on the locking rod 90 to thereby inhibit relative movement of the locking rod.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:
1. A vehicle seat assembly comprising:
   a seat back that is pivotable about an axis of rotation and including a first connector; and
   a reclining assembly that includes
   a base adapted to be mounted to a portion of a vehicle,
   a carrier secured to the base and including a rod guide,
   a curved rod interfacing the rod guide for movement relative to the base, wherein the curved rod has a radius of curvature that extends from an origin proximate the axis of rotation when the seat assembly is mounted in the vehicle, a second connector attached to the curved rod and attachable to the first connector, and a spring disposed about the curved rod and having a fixed end that is fixed relative to the base and a movable end that is movable with respect to the fixed end, wherein the spring is movable between a first orientation for retaining the curved rod with respect to the base and a second orientation for allowing the curved rod to move with respect to the base to adjust pivot angle of the seat back.

2. The vehicle seat assembly of claim 1 wherein the carrier is formed integrally with the base.

3. The vehicle seat assembly of claim 1 wherein the reclining assembly includes a curved spring housing having a transverse slot that receives the movable end therein, the movable end being biased into engagement with a wall of the transverse slot when the movable end is in a first orientation.

4. The vehicle seat assembly of claim 3 wherein in the first orientation, an inner surface of the spring engages the curved rod to substantially inhibit movement of the curved rod relative to the carrier.

5. The vehicle seat assembly of claim 3 wherein rotation of the movable end through the transverse slot to a second orientation increases an internal diameter of the spring, and wherein in the second orientation, an inner surface of the spring is spaced apart from the curved rod to permit movement of the curved rod relative to the carrier.

6. An adjustable connector assembly for use with a vehicle seat back pivotally mounted in a vehicle, the connector assembly comprising:

a base adapted to be mounted to a portion of the vehicle;

a carrier secured to the base and including a rod guide;

a curved rod interfacing the rod guide for movement relative to the base, the curved rod defining a first curved central axis;

a connector attached to the curved rod and attachable to the seat back; and a spring disposed about an outer perimeter of the curved rod, the spring having a fixed end and a movable end, wherein the spring is movable between a first orientation for retaining the curved rod with respect to the base and a second orientation for allowing the curved rod to move with respect to the base.

7. The adjustable connector assembly of claim 6 wherein the spring is a curved spring defining a second curved central axis that is coaxial with the first curved central axis.

8. The adjustable connector assembly of claim 6 wherein the curved rod includes a radius in the range of approximately 350 mm to approximately 550 mm.

9. The adjustable connector assembly of claim 6 further comprising a striker secured to the curved rod at a first end of the curved rod, the striker defining at least a portion of a latch interface.

10. The adjustable connector assembly of claim 9 further comprising an end cap secured to the curved rod at a second end of the curved rod opposite the first end.

11. The adjustable connector assembly of claim 6 wherein the carrier is a first carrier defining a first central axis, and wherein the adjustable connector assembly further comprises a second carrier secured to the base and including a second rod guide defining a second central axis that intersects the first central axis at an oblique angle.

12. A vehicle seat adjustable striker assembly comprising:

a base adapted to be mounted to a portion of a vehicle;

a first carrier secured to the base and including a first rod guide defining a first central axis;

a second carrier secured to the base and including a second rod guide defining a second central axis that intersects the first central axis at an oblique angle;

a spring housing extending between the first and second carriers; and a spring disposed at least partially within the spring housing and extending between the first and second carriers.

13. The vehicle seat adjustable striker assembly of claim 12 wherein the spring housing is a curved spring housing that defines a curved central axis.

14. The vehicle seat adjustable striker assembly of claim 12 wherein the spring is an eccentrically-loaded spring having a fixed end and a rotatable end.

15. The vehicle seat adjustable striker assembly of claim 14 further comprising a spring retainer disposed at an inboard surface of the first carrier, the spring retainer including a retention post that receives the fixed end of the spring.

16. The vehicle seat adjustable striker assembly of claim 14 wherein the spring housing includes a transverse slot extending through a wall of the spring housing, wherein the rotatable end of the spring extends at least partially through the transverse slot.

17. The vehicle seat adjustable striker assembly of claim 16 wherein the transverse slot extends at least 45 degrees about a central axis of the spring housing.

18. The vehicle seat adjustable striker assembly of claim 16 further comprising a handle secured to the rotatable end of the spring proximate the transverse slot.

19. The vehicle seat adjustable striker assembly of claim 16 wherein rotational movement of the rotatable end of the spring through the transverse slot increases an internal diameter of the spring from a first diameter to a second diameter.

20. The vehicle seat adjustable striker assembly of claim 16 further comprising a second spring disposed within the spring housing, the second spring including a second fixed end and a second rotatable end that extends through the transverse slot.

* * * * *